United States Patent Office 3,368,129
Patented Feb. 6, 1968

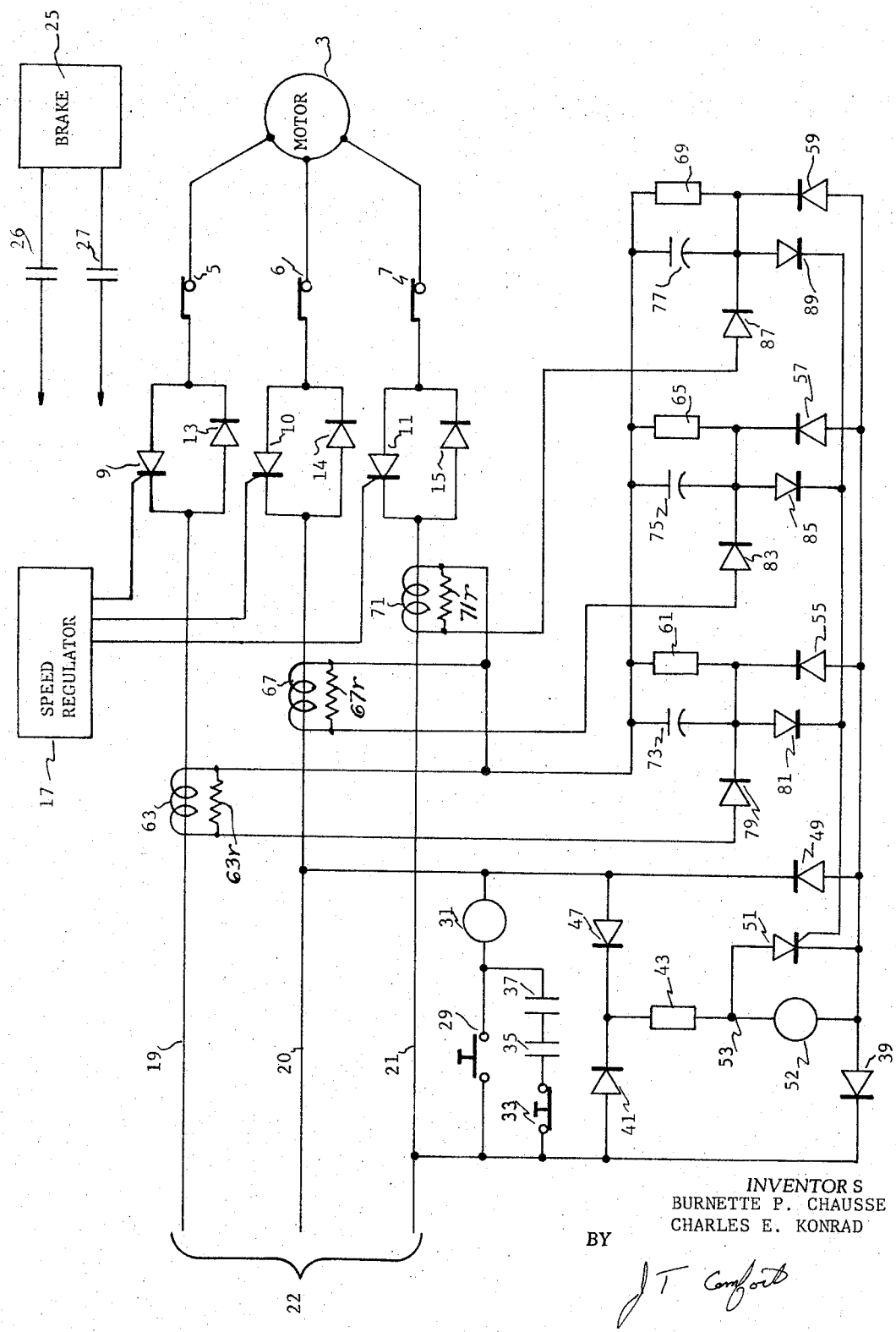

3,368,129
MOTOR CONTROL CIRCUIT EMPLOYING BRAKE MEANS FOR PROTECTION AGAINST UNBALANCE OF SOURCE CURRENT
Burnette P. Chausse and Charles E. Konrad, Roanoke, Va., assignors to General Electric Company, a corporation of New York
Filed Dec. 15, 1965, Ser. No. 513,944
5 Claims. (Cl. 318—204)

This invention is directed to a crane control and specifically to a crane control using silicon controlled rectifiers. Silicon controlled rectifiers are used in three phase alternating current powered cranes because the control is fast responding, accurate and stepless. The speed of the crane motor can be closely controlled by controlling the triggering of the silicon controlled rectifiers in each phase line of the crane motor. Normally a silicon controlled rectifier and a diode connected in parallel and opposite polarity are connected in each phase line of the crane motor. The resulting control is very reliable and accurate. However, as with all crane controls it is always possible that the crane control might fail. This is dangerous as the failure may occur when there is a load on the crane. There are several possible areas of failure. There may be a shorted silicon controlled rectifier or an opened silicon controlled rectifier. The diode may short or open. There may be a blown fuse. A collector may open or short. There may be an open supply phase or an open motor phase.

A brake is provided in most cranes to prevent the load from dropping when the power to the hoist motor is interrupted. There is a significant problem in monitoring the control operation to detect an unpredictable failure in the power circuit and the control circuit and activate the brake.

It is therefore an object of this invention to provide a new and improved crane control for monitoring the operation of the crane.

Another object of this invention is to provide a new and improved crane control for controlling the operation of the crane upon failure of the crane motor.

It is another object of this invention to apply a brake to the crane upon a failure in the control circuit of the crane.

The invention is set forth with particularity in the appended claims. The principles and characteristics of the invention, as well as other objects and advantages are revealed and discussed through the medium of the illustrative embodiments appearing in the specification and drawing which follow.

Referring now to the drawing for a description of the crane control circuit with the monitoring circuit.

The crane motor 3 is connected in a three phase power supply through three collectors 5–7 to the anodes of silicon controlled rectifiers 9–11 and to the cathodes of rectifier diodes 13–15. The silicon controlled rectifier and rectifier diode in each phase of line controls the current in that line to the motor 3 according to the speed regulator 17. Each line 19–21 is connected to a three phase power source 22 and to the anode of a rectifier diode 13–15 and to the cathode of a silicon controlled rectifier 9–11. Silicon controlled rectifier 9 and rectifier diode 13 are connected in line 19, silicon controlled rectifier 10 and rectifier diode 14 are connected in line 20 and silicon controlled rectifier 11 and rectifier diode 15 are connected in line 21. A crane brake 25 is connected through normally open contacts 26 and 27 to lines 19 and 20.

Line 21 is connected through start button 29 and motor starting relay coil 31 to line 20. Line 21 is also connected through normally closed stop pushbutton 33, normally open start motor relay contacts 35, normally open undervoltage relay contacts 37, through motor starting relay coil 31, to line 20. Motor start relay coil 31, when energized, closes normally open motor relay contacts 35.

Line 20 is also connected to the anode of rectifier diode 39 and to the cathode of rectifier diode 41. The cathode of diode 41 is connected through resistor 43, undervoltage relay coil 52, to the anode of rectifier diode 39.

The cathode of rectifier diode 41 is connected also to the cathode of rectifier diode 47 with the anode of rectifier diode 47 connected to line 20 and to the cathode of rectifier diode 49. The anode of silicon controlled rectifier 51 is connected to a terminal point 53 between resistor 43 and relay coil 52. The cathode of silicon controlled rectifier 51 is connected to the anode of diode 39 and to the anode of diode 49, to the anode of diode 55, to the anode of diode 57, and to the anode of diode 59. The cathode of diode 55 is connected through resistor 61 to one side of a coil 63 around line 19, the cathode of diode 57 is connected through resistor 65 to one side of a coil 67 around line 20, and the cathode of diode 59 is connected through resistor 69 to one side of a coil 71 around line 21. Capacitor 73 is connected across resistor 61, capacitor 75 is connected across resistor 65, and capacitor 77 is connected across resistor 69. Capacitor 73 is connected to the anode of diode 79, and to the cathode of diode 81. The cathode of diode 79 is connected to the other side of coil 63. Capacitor 75 is connected to the anode of diode 83 and to the cathode of diode 85. The cathode of diode 83 is connected to the other side of coil 67. Capacitor 77 is connected to the anode of diode 87 and to the cathode of diode 89. The cathode of diode 87 is connected to the other side of coil 71. The gate of silicon controlled rectifier 51 is connected to the anodes of diodes 81, 85, and 89.

In order to prevent firing of the controlled silicon rectifiers when the voltages across the capacitors are equal a resistance $63r$ is connected across coil 63, a resistance $67r$ across coil 67, and a resistance $71r$ across coil 71.

The start pushbutton 29 is closed to energize the motor start relay coil 31, closing the normally closed brake relay contacts 26 and 27, and closing the normally open start motor contacts 35. Current flows through each of the lines 19–21. The speed regulator 17 triggers each of the silicon controlled rectifiers 9–11 in the lines 19–21 according to the speed desired in the crane motor 3. Current in lines 20 and 21 energizes undervoltage relay coil 52, before start button is pushed, closing normally open undervoltage relay contacts 37 to keep start motor relay coil 31 energized. Normally capacitors 73, 75, and 77 are charged to an equal voltage due to the balanced current in lines 19–21. There is no circulating current between the three capacitors 73, 75, and 77.

A malfunction such as a shorted or open silicon controlled rectifier, a shorted or open diode, a blown fuse, an open or shorted collector, an open supply phase, or an open motor phase may occur. There is then significantly less current in one of the lines than in the other two lines. One capacitor then changes to a significantly less potential than the other two capacitors. The current then circulates to equalize the voltage between the three capacitors, applying current to the gate of silicon controlled rectifier 51, to trigger silicon controlled rectifier.

Silicon controlled rectifier 51 then conducts to shunt out the undervoltage relay coil 52, de-energizing the undervoltage relay coil 52. The undervoltage relay coil 52 when de-energized opens the undervoltage relay contacts 37, to de-energize the motor start relay coil 31. The motor start relay coil 31 when de-energized opens the brake contacts 26 and 27 to apply the brake 25 to the crane motor 3. The crane motor 3 is then stopped by the brake 25 to hold the load on the crane at the point in space that it was when a malfunction occurred to the crane control.

The start pushbutton 29 may then be depressed again to start the crane motor again to determine if the malfunction was merely an intermittent malfunction. If the crane motor 3 continues to operate, there is no further problem. If the brake is applied again in the manner described, there is a malfunction that must be corrected.

In summary, then, a new and improved silicon controlled rectifier crane control has been described. Any malfunction is detected so that the brake is immediately applied to the crane motor.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A crane control comprising a three phase motor, a three phase power supply, means connecting each phase of said three phase motor to said three phase power supply, three silicon controlled rectifiers, three rectifier diodes, means connecting a silicon controlled rectifier and a diode in parallel in each phase between said motor and said power supply, a speed regulator connected to the gate electrode of each of said silicon controlled rectifier to control the triggering of said silicon controlled rectifier, means for sensing the current in each phase between said motor and said power supply, a brake for stopping said motor, and means responsive to an unbalance between the current in the three phases to apply said brake to said crane motor to stop said crane motor.

2. The invention as claimed in claim 1 wherein a fourth silicon controlled rectifier is connected to said sensing means and responsive to an unbalance between the current in the three phases to apply said brake to said crane motor to stop said crane motor.

3. The invention as claimed in claim 1 wherein three capacitors are connected to said current sensing means with each capacitor normally charging from one phase to a substantially equal voltage, a fourth silicon controlled rectifier, means connecting said three capacitors to the gate of said fourth silicon controlled rectifier to trigger said fourth silicon controlled rectifier on when there is an unbalance between said three capacitors, and means responsive to the triggering on of said fourth silicon controlled rectifier for applying said brake to said crane motor to stop said crane motor.

4. The invention as claimed in claim 1 wherein said means for sensing the current in each phase including coils about each line between said three phase motor and said three phase power supply, three capacitors, means connecting each sensing coil to one of said capacitors so that each capacitor normally charges to an equal voltage, a fourth silicon controlled rectifier, means connecting said three capacitors to the gate electrode of said fourth silicon controlled rectifier to trigger said fourth silicon controlled rectifier on when there is an unbalance between said three capacitors, and means responsive to the triggering on of said fourth silicon controlled rectifier for applying said brake to said crane motor to stop said crane motor.

5. The invention as claimed in claim 1 wherein said means for sensing the current in each phase includes coils about each line between said three phase motor and said three phase power supply, three capacitors, means connecting each sensing coil to one of said capacitors so that each capacitor normally charges to an equal voltage, a relay coil connected across two lines of said three phase power supply so that said relay coil is normally energized, normally open relay contacts in the power supply of said brake closed by said relay coil to keep said brake from stopping said crane motor, a fourth silicon controlled rectifier connected across said relay coil, means connecting said three capacitors to the gate electrode of said fourth silicon controlled rectifier to trigger said fourth silicon controlled rectifier on when there is an unbalance between said three capacitors to shunt out said relay coil opening said relay contacts to apply said brake to said crane motor to stop said crane motor.

References Cited

UNITED STATES PATENTS

| | | | |
|---|---|---|---|
| 2,930,938 | 3/1960 | Tapper | 317—46 |
| 3,328,638 | 6/1967 | Reis | 317—27 |
| 3,332,008 | 7/1967 | Mueller et al. | 318—227 XR |

ORIS L. RADER, *Primary Examiner.*

G. RUBINSON, *Assistant Examiner.*